United States Patent [19]

Perkins

[11] Patent Number: 4,829,699
[45] Date of Patent: May 16, 1989

[54] LURE TANGLE FREE FLOATING TACKLE BOX

[76] Inventor: Thomas A. Perkins, 2324 NW. 34, Oklahoma City, Okla. 73112

[21] Appl. No.: 247,821

[22] Filed: Sep. 22, 1988

[51] Int. Cl.⁴ ............................................. A01K 97/06
[52] U.S. Cl. ........................................ 43/57.1; 43/54.1
[58] Field of Search ............................ 43/57.1, 54.1; 206/315.11

[56] References Cited

U.S. PATENT DOCUMENTS

| | | | |
|---|---|---|---|
| 1,591,297 | 7/1926 | Dumouchel | 43/57.1 |
| 2,711,050 | 6/1955 | McIntyre | 43/57.1 |
| 3,600,840 | 8/1971 | Meyer | 43/57.1 |
| 4,208,826 | 6/1980 | Lindaman | 43/57.1 |
| 4,729,474 | 3/1988 | Lahius et al. | 43/54.1 |

FOREIGN PATENT DOCUMENTS

| | | | |
|---|---|---|---|
| 1960405 | 6/1971 | Fed. Rep. of Germany | 43/57.1 |
| 73167 | 6/1951 | Norway | 43/57.1 |

Primary Examiner—Nicholas P. Godici
Assistant Examiner—Carmine Cuda
Attorney, Agent, or Firm—Robert K. Rhea

[57] ABSTRACT

A water tight buoyant fishing tackle box is divided by a plurality of removal partitions extending between its front and back walls. Each partition is equipped with resilient fishook retaining material on one or both sides for supporting fishing lures. Additionally, the respective top of each of the partitions is slotted in aligned relation for temporarily supporting one of the partitions with its bottom edge portion inserted into the slots for ease of access to the fishing lures on the removed partition.

4 Claims, 1 Drawing Sheet

U.S. Patent | May 16, 1989 | 4,829,699
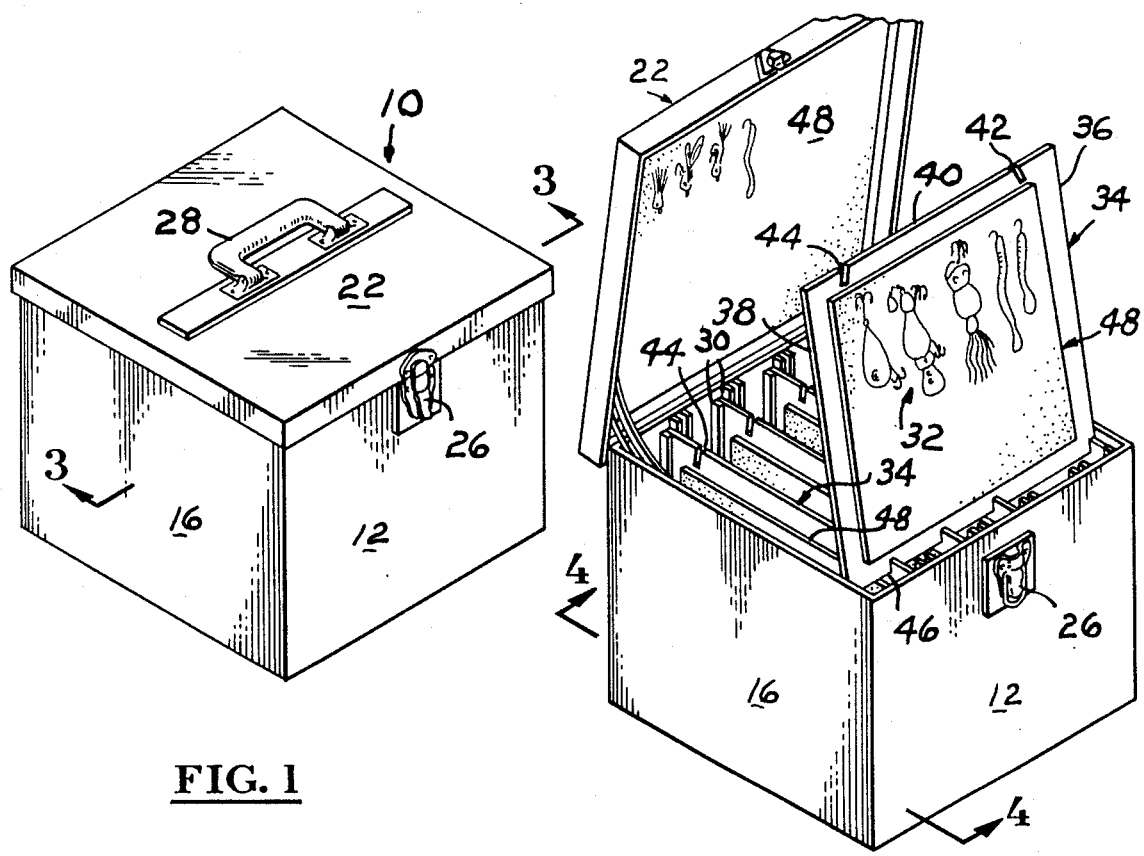
FIG. 1
FIG. 2
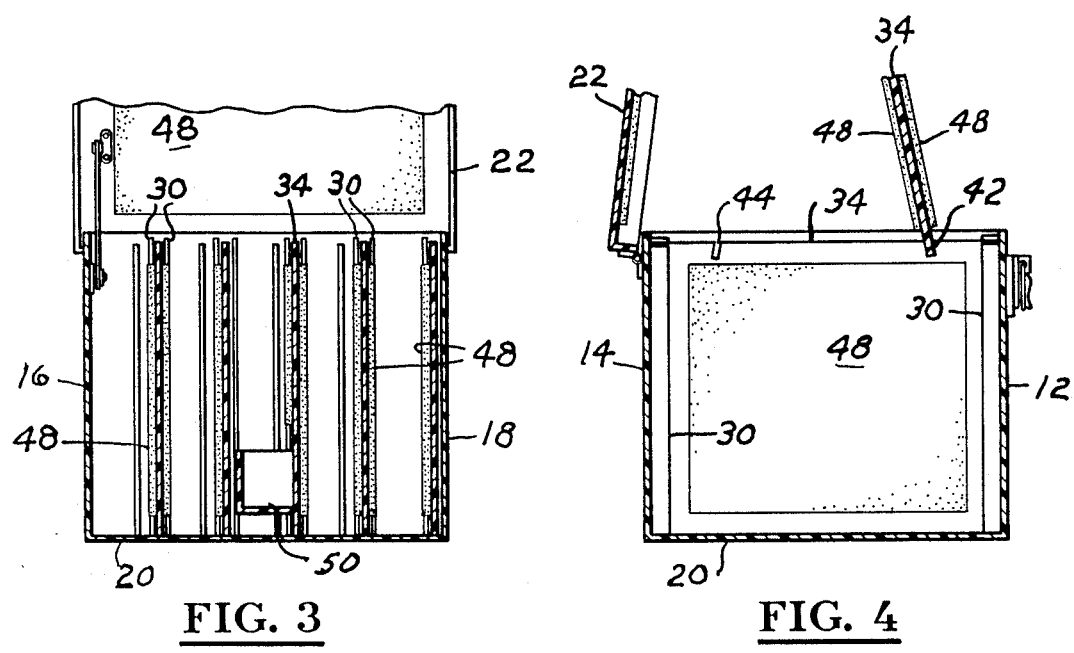
FIG. 3
FIG. 4

LURE TANGLE FREE FLOATING TACKLE BOX

BACKGROUND OF THE INVENTION

1. Field of the Invention

This invention relates to fishing and more particularly to a fishing tackle box.

Most fishermen utilize some type of container for storing and maintaining their fishing lures accessible while fishing. These containers range from a lid covered box to compartmentalized containers which may include drawers or shelves. The compartmentalized or divided fishing tackle box does not ordinarily provide a means for maintaining the hook equipped lures separated from each other and as a result of moving the tackle box from one location to another the hook equipped lures become entangled, requiring patience and time to separate to obtain the desired lure.

This invention eliminates the hook and lure entanglement problems of such fishing tackle boxes.

2. Description of the Prior Art

U.S. Pat. No. 4,208,826 is an example of a fishing tackle box compartmentalized in the form of a plurality of trays, each tray being lid covered and partitioned to form a plurality of juxtaposed compartments for containing lures, or the like. If only one lure is placed in each partitioned tray compartment no entanglement occurs, however, it is common practice to place a plurality of relatively small lures in one of the tray compartments thus creating the entanglement problem.

This invention is distinctive over this and other similar tackle box patents by a partitioned lid covered box in which the partitions separably support the hook equipped lures and may be individually removed from the box.

SUMMARY OF THE INVENTION

A rectangular upwardly open water tight sealing lid equipped tackle box is provided with a plurality of vertical parallel spaced-apart partition wall guides in confronting relation on opposing sides of the box. Each pair of partition guides respectively receive a respective end portion of a planar partition. At least one side wall of each partition is provided with a layer of synthetic material, such as a lightweight buoyant material commonly known by the trademark Styrofoam. The purpose of the Styrofoam is to removably receive the hook or hooks of a hook equipped fishing lure, the lures being manually positioned on each partition in spaced-apart tangle free relation. Each partition is provided with an angularly positioned slot at least equal in depth and width with respect to the thickness of the respective partition. The slots in the several partitions are disposed in aligned relation adjacent the forward wall of the tackle box opposite the lid hinged connection. The purpose of the slots is to support any one of the partitions when removed from the tackle box and inserted, at its depending edge, into the slots of the partitions remaining therein.

The principal object of this invention is to provide a tackle box having a plurality of partitions extending in spaced relation from front to rear of the tackle box in laterally generally equally spaced relation in which each partition supports a panel of fishhook receiving and releasing material for supporting fishing lures in tangle free relation and in which any one partition may be supported in substantially upstanding relation above the top plane of the box when removed therefrom.

BRIEF DESCRIPTION OF THE DRAWINGS

FIG. 1 is a perspective view of the tackle box in closed position;

FIG. 2 is a fragmentary perspective view illustrating the tackle box in lid open position of the relative position of a lure supporting partition when removed from the box; and, FIGS. 3 and 4 are vertical cross sectional views taken substantially along the line 3—3 and 4—4 of FIGS. 1 and 2, respectively.

DESCRIPTION OF THE PREFERRED EMBODIMENTS

Like characters of reference designate like parts in those figures of the drawings in which they occur.

In the drawings:

The reference numeral 10 indicates the tackle box which is rectangular in general configuration. The tackle box 10 is defined by a front wall 12, a rear wall 14, opposing side walls 16 and 18 and a bottom wall 20. Each of the side walls and bottom wall are preferably unitary to form a sealed water tight box. The box 10 is covered by a water tight lid 22 secured by hinges 24 to the back wall 14 and, when closed, is secured by a latch 26. The lid is further provided with a conventional handle 26.

The inside surface of the front and back walls 12 and 14 are provided with a plurality of pairs of vertical partition guides 30. Each of the guides 30 are substantially square in transverse section having a length slightly less than the vertical height of the tackle box walls and are formed on or vertically secured to the wall surfaces in spaced-apart relation, the space between each of the guides 30 being determined by the thickness of partitions to be supported therebetween, as presently explained.

The spacing between each pair of pairs of partition guides being selected in accordance with the physical dimensions of a plurality of hook equipped fishing lures, such as the lures 32, to be supported by the respective partitions. The pairs of partition guides 30 being respectively arranged on the side surfaces of the front and back walls 12 and 14 in aligned confronting relation so that respective back to front pairs of the partition guides receive one of a plurality of tackle box partitions 34.

Each tackle box partition 34 is formed from planar material having overall dimensions freely received slidably by each of its end surfaces 36 and 38 by a selected pair of the partition guides in vertical sliding relation for ease of insertion and removal from the box. The vertical or top to bottom height of each partition being slightly less than the vertical height of the tackle box walls.

The top edge 40 of each of the partitions is provided with preferably a pair of slots 42 and 44 adjacent its respective end surface 36 and 38. The width of each slot 42 and 44 is such that it freely receives slidably the depending edge portion 46 of any one of the partition 44 when removed from the box. The pairs of slots 42 and 44 in the respective partitions being disposed in cooperative alignment so that each of the partitions remaining in the box support a removed partition above the top plane of the box when the removed partition is inserted thereinto, as illustrated by FIG. 2. Each of the slots 42 and 44, in the respective partition being preferably angled downwardly from the top toward the respective adjacent end surface of the partition for the purposes of disposing the removed and slot supported partition in an angular direction tilted toward the tackle box raised lid.

Each of the partitions 34 is further provided with at least one planar section of resilient material, such as the plastic presently marketed under the trade mark Styrofoam. Each section of hook receiving resilient material 48 being bonded to the flat surface of the partition for receiving the hooks of the lures 32. Similarly, a section of the resilient hook receiving material 48 is bonded to the inner surface of the lid 22 for supporting relatively small size hook equipped lures or flies thereon. Additionally, a small box-like container forming a small tackle compartment 50 may be attached to a selected one of the partitions 34 to hold small items, such as swivels, lead weights, etc.

OPERATION

Operation seems obvious from the above description but briefly stated with the box constructed and described the lures are attached to one or both sides of the respective partitions and when a selected type of fishing lure 32 is desired the partition containing that group of lures is manually removed from the open tackle box. The partition being placed within the row of slots 42 while adding to or removing fishing lures. The box is normally maintained in closed position particularly when on board a boat so that in the event of the boat being swamped or over turned the tackle box, by its volume of water displacement, will float.

Obviously the invention is susceptible to changes or alterations without defeating its practicability. Therefore, I do not wish to be confined to the preferred embodiment shown in the drawings and described herein.

I claim:
1. A buoyant lure tangle free tackle box, comprising:
   a watertight box having a lid and front and back walls;
   a plurality of vertically disposed partitions removably extending between the front and back walls in laterally spaced relation;
   means on each said partition for supporting a plurality of fishing lures; and,
   means at one edge of each said partition for engaging an edge of any one of the other partitions for supporting said any one of the partitions in an elevated substantially upstanding position with respect to the remaining partitions when removed from the box.
2. The tackle box according to claim 1 in which the lure supporting means includes:
   fishhook receiving panels bonded to at least one side surface of each partition.
3. The tackle box according to claim 1 in which the partition edge means comprises:
   a partition edge receiving slot formed in the topmost edge of each partition adjacent one of its vertical surfaces.
4. The tackle box according to claim 3 in which the slots are cooperatively aligned and are inclined away from the respective said vertical surface.

* * * * *